April 2, 1940.                J. R. HILL                2,195,964
                           SAW DISPLAY STAND
                          Filed Aug. 8, 1939           2 Sheets-Sheet 1

WITNESSES

INVENTOR
John R. Hill
BY
ATTORNEYS

April 2, 1940.  J. R. HILL  2,195,964
SAW DISPLAY STAND
Filed Aug. 8, 1939  2 Sheets-Sheet 2
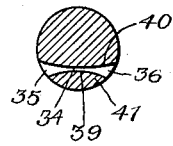
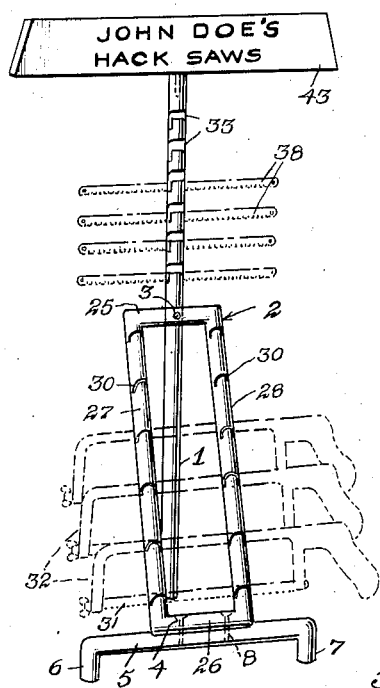
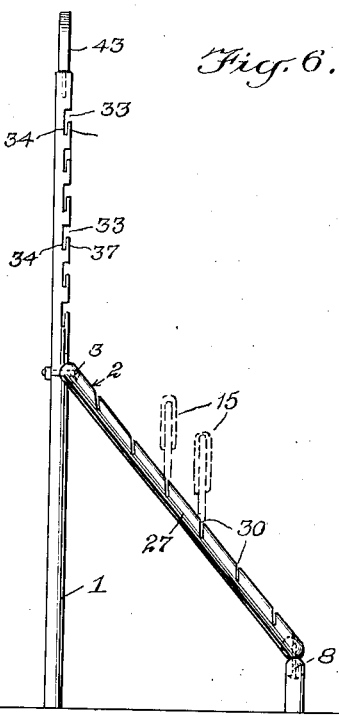
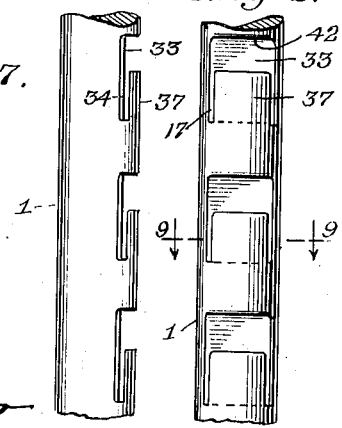
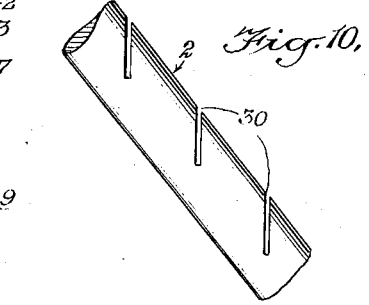
WITNESSES
INVENTOR
John R. Hill
BY
Munn, Anderson & Liddy
ATTORNEYS Patented Apr. 2, 1940

2,195,964

UNITED STATES PATENT OFFICE 2,195,964

SAW DISPLAY STAND

John Rogers Hill, New Albany, Miss.

Application August 8, 1939, Serial No. 288,918

4 Claims. (Cl. 211—60)

This invention relates to saw display stands and has for an object to provide a construction which will properly hold saw blades while permitting easy removal.

Another object of the invention is to provide a stand wherein saw frames are grouped at one place and hack saw blades for the frames are supported at another place.

An additional and more specific object is to provide a stand wherein hack saw frames are held in vertical position while a group of blades are arranged above the frames and are pinched by the stand to disengageably hold the blades in position.

In the accompanying drawings—

Fig. 5 is a perspective view of a hack saw blade and frame stand disclosing another form of the invention;

Fig. 6 is an edge view of the structure shown in Fig. 5;

Fig. 7 is an enlarged fragmentary view of the upper part of the stand shown in Fig. 5;

Fig. 8 is a front view of the structure shown in Fig. 7;

Fig. 9 is a sectional view through Fig. 8 approximately on the line 9—9;

Fig. 10 is an enlarged fragmentary view of a portion of the stand designed to carry hack saw frames.

Figure 1:
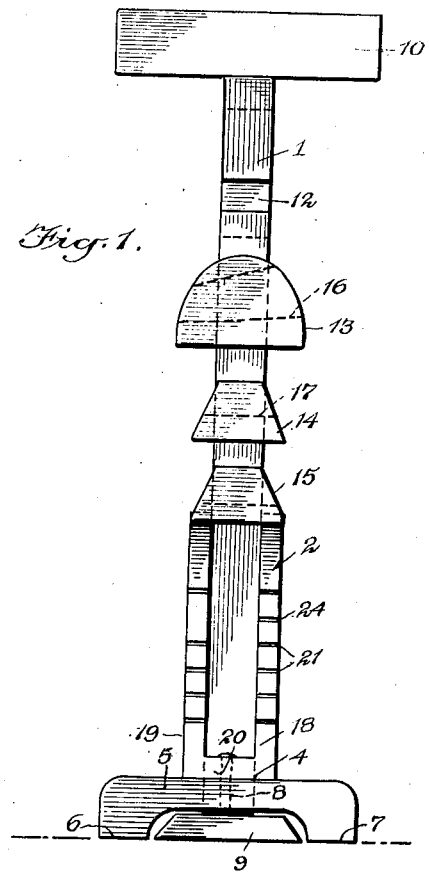
Fig. 1 is a front view of a saw display stand disclosing an embodiment of the invention.
Figure 2:
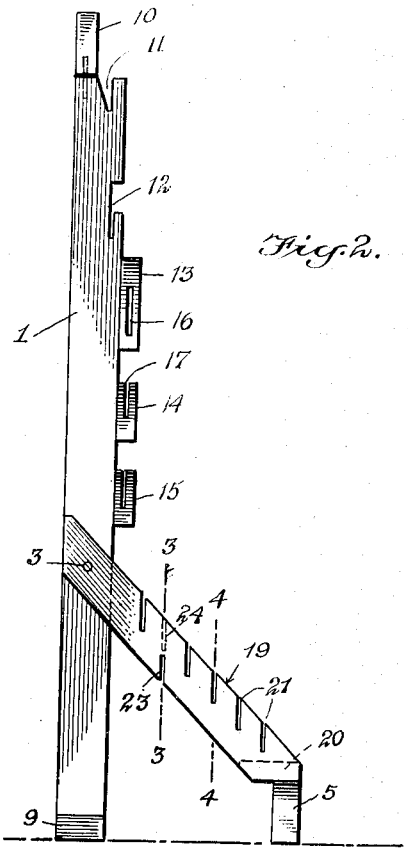
Fig. 2 is a side elevation of the structure shown in Fig. 1.

Referring to the accompanying drawings by numerals, 1 indicates an upright which may be made of wood or other suitable material, and 2 an inclined frame rigidly secured at 3, by means of a bolt or other means, to the upright 1 and at 4 to a cross bar 5 which is provided with supporting legs 6 and 7. Nails, bolts, or other means 8 could be used for securing the frame 2 to the bar 5.

The frame or upright 1 is preferably rectangular in cross section and is provided with an enlargement or foot 9 at the bottom and a removable sign board 10 at the top. The frame or upright 1 is provided with a notch 11 at the top and a substantially L-shaped notch 12 at a point spaced downwardly from the top. These notches are adapted to receive saws or other articles. Enlargements or blocks 13, 14 and 15 are either formed integral with the upright 1 or rigidly secured thereto by adhesive, nails, or other means. The block 13 is provided with a tapering slot 16, whereby a tapering saw or other article may be supported by the block and held on display. Blocks 14 and 15 each have a slot 17 for receiving a saw blade or other article. The saw blades may be any conventional saw blades now on the market.

Figure 3:
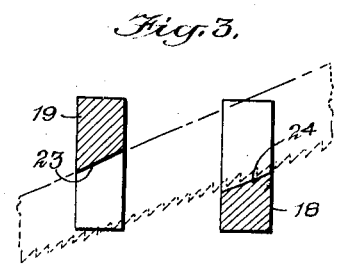
Fig. 3 is an enlarged fragmentary sectional view through Fig. 2 on the line 3—3.
Figure 4:
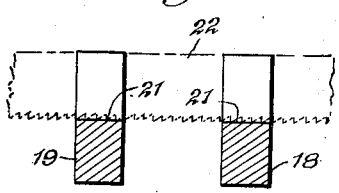
Fig. 4 is an enlarged fragmentary sectional view through Fig. 2 on the line 4—4.

The stand 1 is preferably made of wood and also the side or bracing bars 18 and 19, which are nailed or otherwise rigidly secured to the stand 1 at their upper ends and at their lower ends are connected together by a bar 20. A cross bar or board 5 is secured to the lower end of the side bars 18 and 19. The cross bar 5 merges into spaced feet 6 and 7, which act to prevent the stand from tilting. The side bars 18 and 19 are each provided with a number of vertical slots 21, whereby a saw blade 22 may be supported and held for display. Where the saw blade is larger at one end than at the other, it may be arranged in special slots 23 and 24, as shown in Fig. 3, and thereby held in position for display.

In this form of the invention, hack saws may be displayed if desired but the structure is so formed that hand saws, cross cut saws, and other similar devices may be held on display in such a way as to be readily removable whenever desired.

In Figs. 5 to 10, inclusive, a slightly modified form of the invention is disclosed. In this form of the invention, top and bottom bars 25 and 26 and side bars 27 and 28 are used. The respective side bars 28 and 27 are provided with slits 30, as shown in Fig. 7, so as to receive the blades 31 carried by the respective hack saw frames 32. The frames 32 will stand substantially vertical when in operative position, as shown in dotted lines in Fig. 6, and may be readily removed by a slight pull upwardly. However, as illustrated in Fig. 5, it will be seen that all of the frames are clearly exposed to view so that anyone wishing to examine or buy a frame may readily see all the frames and how the various blades 31 fit therein.

The frame 2 not only acts to support the hack saw frames 32, but acts as a support for the upright 1, which is preferably a round piece of wood and provided with a number of specially constructed notches 33 merging into a depending notch 34, which depending notch 34 is provided with flaring side portions 35 and 36, as shown in Fig. 9. The formation of this notch results in the provision of a clamping finger 37, which engages the respective blades 38 at point 39. The side walls of the notches 33 and 34 are curved, as indicated by the curved lines 40 and 41, whereby a blade may be inserted and pressed downwardly into the notches and held properly in place. This blade may be swung back and forth to a certain extent without injuring the blade or the stand. To remove the blade it may be pulled out longitudinally though ordinarily it is moved vertically upwardly until it strikes the shoulder 12 and then is swung outwardly until it clears the shoulder, after which it is raised sufficiently to be disengaged.

At the top of the post or upright 1 is a plate 43 which may be wood or other suitable material and which may be secured in place in any desired manner. This plate is adapted to receive words indicating the character of the goods supported by the stand.

I claim:

1. A stand of the character described including a single post adapted to be positioned vertically when in use, a rectangular frame adapted to be arranged at an angle to the vertical when in use, means at the top of said frame for rigidly securing the same to said post, a transversely extending bar rigidly secured to the lower end of said frame, and a leg at each end of said bar for supporting the same and preventing the frame and post from tilting, said frame being provided with spaced notches for receiving and holding hack saw frames and blades, said post being provided with a row of notches for receiving and holding hack saw blades independently of the frames.

2. A stand for receiving, supporting and displaying hack saws, including a post adapted to be arranged vertically when in use, said post having a plurality of notches, each notch being provided with a depending auxiliary notch whereby a clamping finger is presented for each notch, said notch including the depending notch being provided with curved walls whereby said finger will act at the central part as means for pinching a hack saw arranged in the notch.

3. A stand for supporting and displaying saws, comprising a post, means forming a foot at the lower end of said post, a pair of bracing bars connected with said post, a transverse bar having feet at the ends connected with the lower end of said bars for steadying the post, said bracing bars having notches for the reception of saw blades, and means carried by the post above the bracing bars for receiving saws of different kinds.

4. A stand for supporting and displaying saws, comprising a post, a pair of diagonal braces extending from said post, and means connected at the lower end of said braces for resisting tilting thereof, said braces having slots cut therein, one of said braces having a notch cut in the lower surface and a plurality of notches in the upper surface.

JOHN ROGERS HILL.